Mar. 6, 1923. 1,447,519
J. SCHADE
FRICTION CLUTCH FOR TELESCOPING ELEMENTS
Filed Jan. 17, 1922   3 sheets-sheet 1
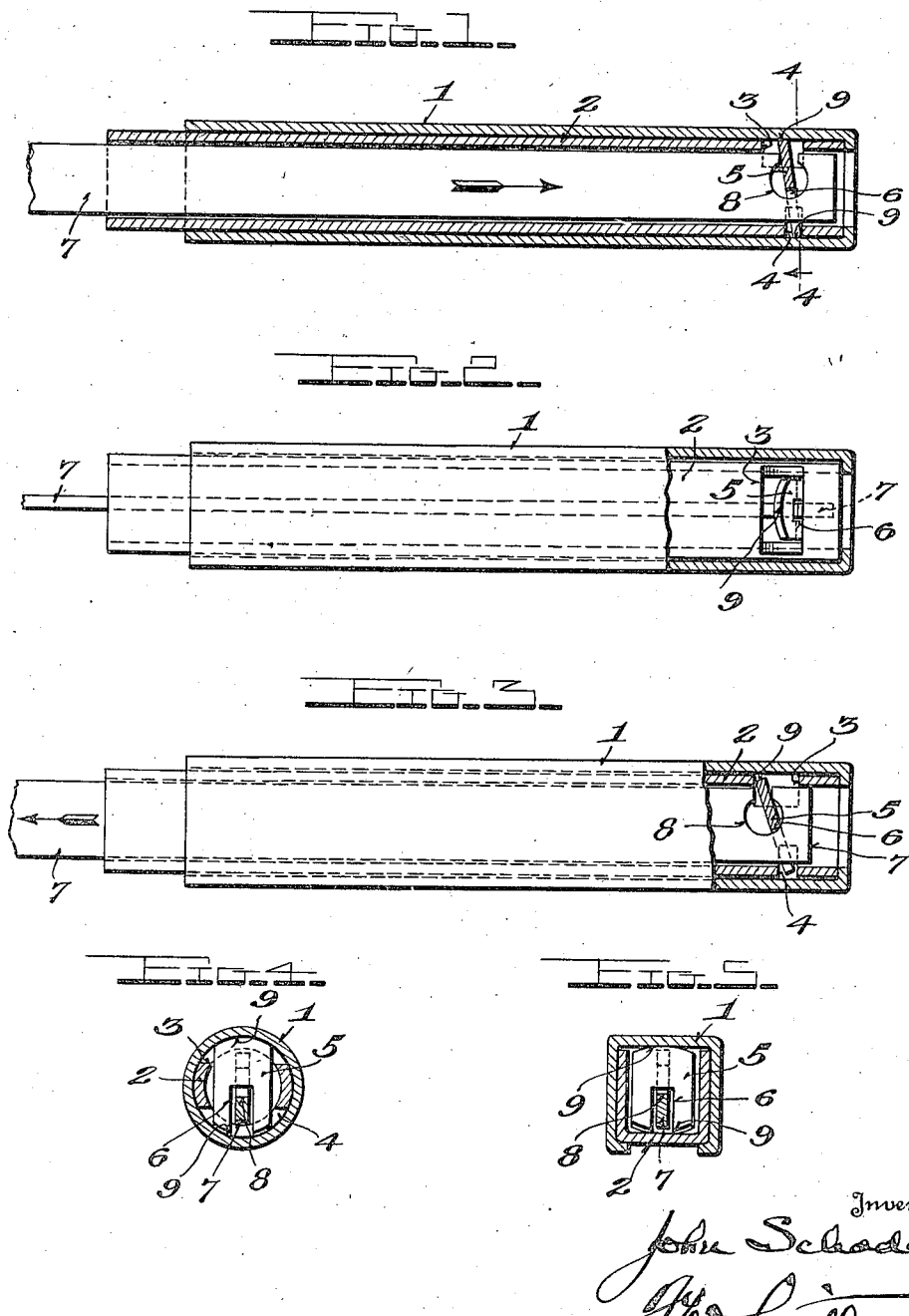

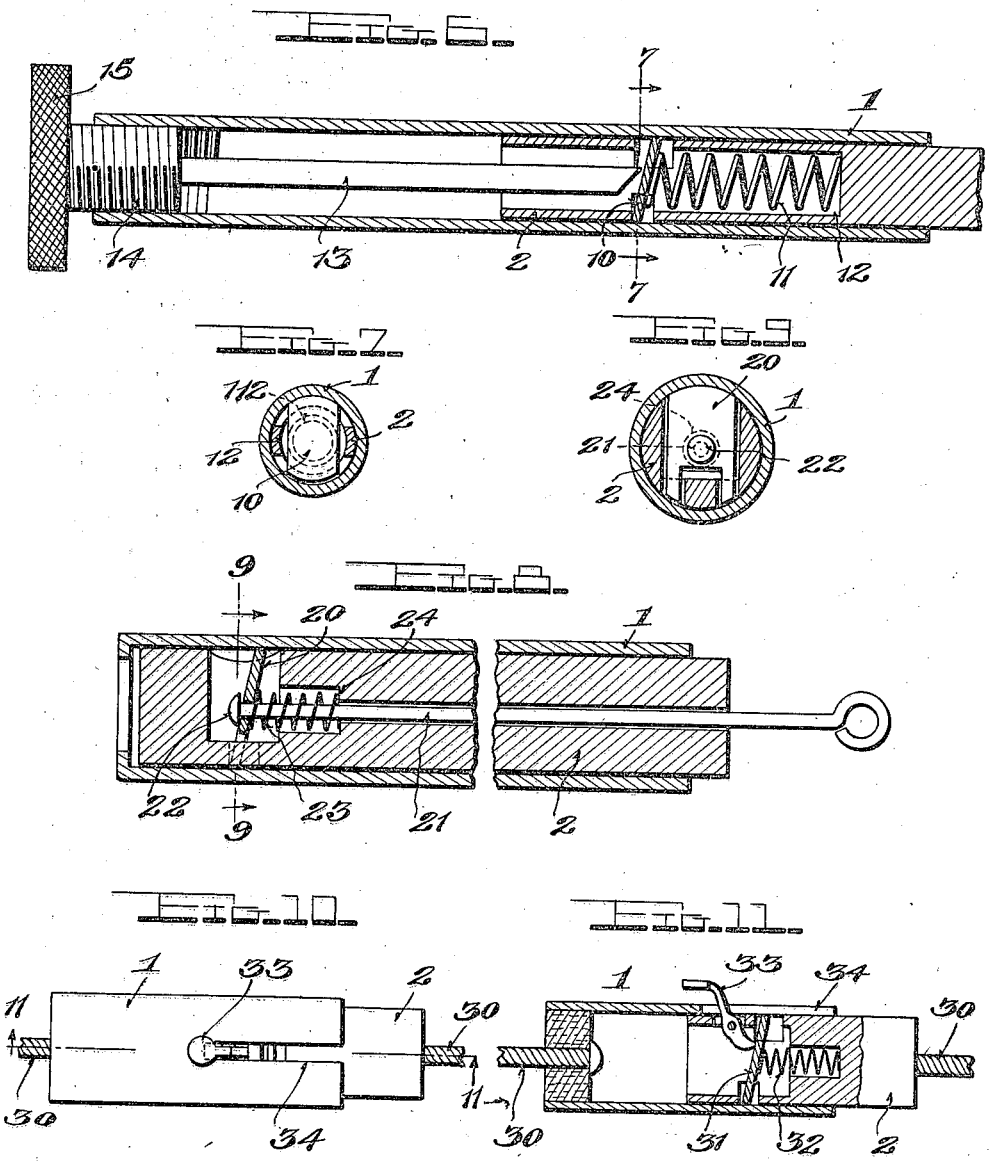

Mar. 6, 1923.                                                   1,447,519
J. SCHADE
FRICTION CLUTCH FOR TELESCOPING ELEMENTS
Filed Jan. 17, 1922          3 sheets-sheet 3
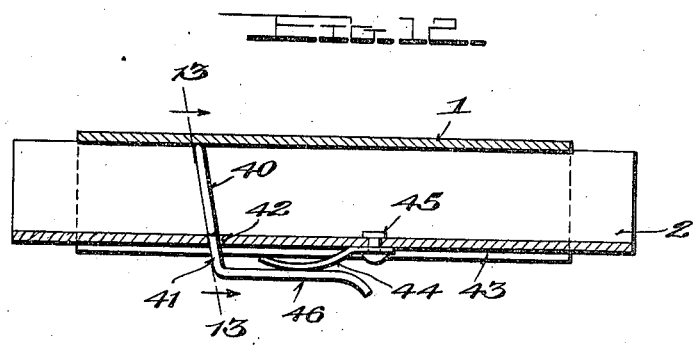
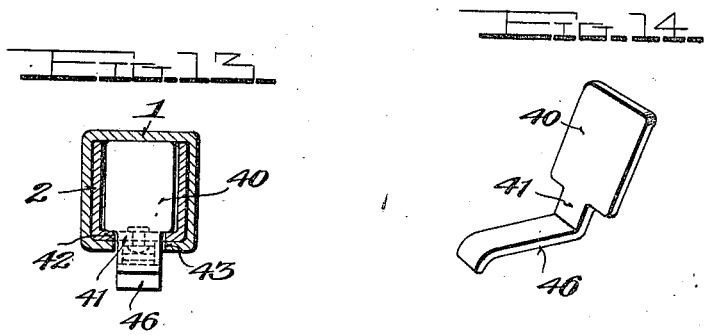
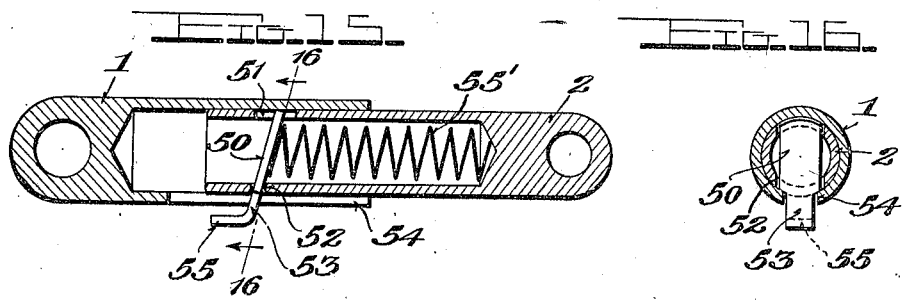
Inventor
John Schade
By
Attorney Patented Mar. 6, 1923.

1,447,519

UNITED STATES PATENT OFFICE.

JOHN SCHADE, OF HOLYOKE, MASSACHUSETTS, ASSIGNOR TO NATIONAL BLANK BOOK COMPANY, OF HOLYOKE, MASSACHUSETTS, A VOLUNTARY TRUST ASSOCIATION OF COPARTNERSHIP, HAVING AS TRUSTEES F. B. TOWNE, E. S. TOWNE, J. M. TOWNE, AND F. W. WILSON.

FRICTION CLUTCH FOR TELESCOPING ELEMENTS.

Application filed January 17, 1922. Serial No. 529,837.

*To all whom it may concern:*

Be it known that I, JOHN SCHADE, a citizen of the United States, residing at the city of Holyoke, in the county of Hampden and State of Massachusetts, have invented certain new and useful Improvements in Friction Clutches for Telescoping Elements; and I do declare the following to be a full, clear, and exact description of the invention, such as will enable others skilled in the art to which it appertains to make and use the same.

This invention relates to certain new and useful improvements in friction clutches, and pertains more particularly to friction clutches used for securing telescoping elements in any position to which same may be adjusted.

The primary object of the invention is to provide a friction clutch which is positive in its action and which can be easily and quickly actuated to both operative and inoperative positions.

A further object of the invention is to provide a friction clutch which has its effective gripping part carried by the inner telescopic element and movable to project outwardly to operate against the inner circumference of the outer telescopic element, the said gripping part being movable inwardly to lie flush with the periphery of the inner telescopic element to allow of free telescopic adjustment of the elements.

Further and other objects will be later set forth and manifested in the course of the following description.

In the drawings:

Figure 1, is a longitudinal sectional view of the invention.

Figure 2 is a top plan view, partly broken away and in section;

Figure 3, is a side elevation, partly broken away and in section showing the clutch in inoperative position;

Figure 4, is a section on line 4—4 of Figure 1;

Figure 5, is a view similar to Figure 4 of a modified form, showing the invention adapted to telescopic elements of square or angular cross-section;

Figure 6, is a longitudinal sectional view of a further modified form of the invention;

Figure 7, is a section on line 7—7 of Figure 6;

Figure 8, is a view similar to Figure 6 of another modified form of the invention;

Figure 9, is a section on line 9—9 of Figure 8;

Figure 10, is a top plan view of a further modified form of the invention;

Figure 11, is a section on line 11—11 of Figure 10;

Figure 12, is a longitudinal sectional view of a still further modified form of the invention;

Figure 13, is a section on line 13—13 of Figure 12;

Figure 14, is a detail perspective view of the clutch proper;

Figure 15, is a longitudinal sectional view of a further modified form of the invention and;

Figure 16, is a section on line 16—16 of Figure 15.

In proceeding in accordance with the present invention, the telescopic elements 1 and 2 are so designated throughout each of the several views and obviously may be of varying cross-sectional forms.

As depicted in Figures 1 to 5, the inner telescopic element 2 is slotted at diametrically opposite points, the slot 3 being wider than the slot 4. The clutch or clamping disk or member 5 is bifurcated as indicated at 6 and straddles an operating bar 7, being received in a slot 8 provided therefor in the bar 7. The bifurcated end of the clamping disk or member 5 is received in the narrower slot 4, while the opposite end thereof is received in the wider slot 3, the slot 4 acting as a pivotal support about which the clamping member 5 rocks into and out of clutching position. The wider slot 3 allows of this rocking movement to an extent to permit the effective clamping end 9 of the member 5 to lie flush with or within the periphery of the male element 2 of the telescopic elements, so as to permit of free telescopic movement of the elements to attain the desired adjustment thereof. When the clamping member occupies the clutching position of Figure 1, in which the edge 9 projects outwardly beyond the periphery of the male element 2, it will be seen that the member 5 is at an incline to the longitudinal axis of the elements and the edges 9 thereof will bind against the inner circumference of the female element, so that pressure tending to separate the elements will effect an increased binding of the member 5 and consequently greater holding action of the clutch.

The above form of the invention does not involve the use of means for exerting constant pressure or tension on the clamping member 5, and in order to provide such tension and in instances of where this is desired or preferred, various forms have been devised and will now be described as illustrating some examples of the manner in which the desideratum just noted can be effected.

Referring now to Figures 6 and 7 the clutching member 10 is tensioned by a coil spring 11 arranged within a pocket 12 provided in male element 2, the spring acting to urge the member 10 to its outward or clutching position. When it is desired to release the member 10 or to move same to its inoperative position, a release rod 13 is provided the latter having threaded connection at 14 to the female element 1 and being equipped with a finger engaging nut 15, so that upon turning of the rod 13, the latter will engage and move the member 10 against the tension of the spring to move the member 10 to its inoperative position, or that in which the member 10 lies completely within or flush with the periphery of the male element 2. This form of the invention, evidences the fact that the male member 2 need not be tubular.

Referring to Figures 8 and 9 of the drawings, it will be seen that the clamping member 20 is perforated to loosely receive a release rod 21, the latter being headed at 22 to provide an abutment which engages the member 20 to move or rock the latter to inoperative position. In this form, the spring 23 surrounds the rod 21 and exerts constant tension against the clamping member 20 and against the end wall 24 of a socket formed in the male element 2 for the reception of the spring 23.

Figures 10 and 11 depict use of the invention in connection with necklaces, or chains and in which the telescopic elements are connected to the chain ends 30 in any suitable manner. In this form, the clamping disk 31 is tensioned by a coil spring 32 and normally urged to clutching position thereby, release of the disk being effected by a release lever 33 suitably pivoted to the male element 2 and having its outer end projecting through a longitudinal slot 34 formed in the female element 1 so that telescopic adjustment of the elements may be effected. By pressing down upon the outer end of the lever 33 the disk will be moved to inoperative position, as is apparent.

In Figures 12, 13 and 14 a still further modified form of the invention is illustrated and in which an approximately L-shaped clamping member 40 is employed the latter having a reduced shank 41 extending through and pivoted in a slot 42 provided therefor in the male element 2. The shank extends through a longitudinal slot 43 provided in the female element 1 and has its outer end portion 46 disposed exteriorly of and substantially parallel to the female element 1 and engaged by a spring 44 riveted at 45 to the male element 2. By pressing upon the end 46 to move the latter toward the female element 1, the clamping member 40 will be moved to inoperative position. In this form of the invention it will be noted that the male element 2 is of substantially U-form, the member 40 extending through the open side of the same and into engagement with the female element 1.

Figures 15 and 16 illustrate a still further modified form wherein the clutching member 50 is of somewhat L-form and extends through slots 51 and 52 formed in the male element 2, the shank 53 of the member being reduced and extending through a longitudinal slot 54 formed in the female element 1. The outer end 55 of the shank of the member 50 is disposed approximately parallel to the elements so as to be capable of operation as in the instance of the end 46 of Figures 12 to 14. A coil spring 55' exerts constant tension on the member 50 so as to normally retain the latter in its clutching position. In this form the spring is housed within the elements and is of coil type, as distinguished from Figures 12 to 14 in which the spring is exposed and is of the flat type.

It will be noted that in the form of the invention depicted in Figures 1 to 11 the clutch or clamping member has each of its opposed edges in binding engagement with diametrically opposed points on the inner circumference of the female member which effects a double grip and consequently greater holding action.

What is claimed is:

1. A friction clutch for telescoping elements, comprising a rockable clutch member carried by the male element and adapted to be impinged against the female element by a force tending to separate said elements.

2. A friction clutch comprising outer and inner telescoping elements, a clutch member pivotally related to the inner element and capable of being projected beyond the periphery of said element by movement in one direction, and means for restoring said member to normal position whereby said elements may be disengaged.

3. A friction clutch comprising outer and inner telescoping elements, a clutch member pivotally related to the inner element and capable of being projected beyond the periphery of said element against the inner surface of the female element, and means for rocking said member.

4. In a friction clutch for telescopic elements, a male element, and a female element receiving the male element, the male element having an opening and a slot diametrically opposite to the opening, and a clutch member having one end rockingly engaged in the slot and having its opposite end movable through the opening to project outwardly from the male element to engage the interior of the female element.

5. In a friction clutch for telescopic elements, a spring pressed clutching member carried by the male element and movable outwardly therefrom to bind against the interior of the female element by a force tending to separate the elements, and means to actuate the member to move same to inoperate position.

6. In a friction clutch for telescopic elements, a male element and a female element receiving the male element, the male element being oppositely slotted, a clutching member pivoted at one end in one slot of the male element and movable in the other slot to project beyond the male element and to engage the interior of the female element, and means to move the member to inoperative position.

7. In a friction clutch for telescopic elements, a male element and a female element receiving the male element, the male element being oppositely slotted, a clutching member pivoted at one end in one slot of the male element and movable in the other slot to project beyond the male element and to engage the interior of the female element, a spring for tensioning said member to normally hold same in clutching position, and means to move the member to inoperative position.

8. In a clutch for telescopic elements, a male element and a female element receiving the male element, and a clutching member carried by the male element and having opposed gripping edges for binding engagement with diametrically opposed points on the interior of the female element, said member being operated to clutch the female element by a force tending to separate said elements.

In testimony whereof I affix my signature hereto.

JOHN SCHADE.